TELEALARM NETWORKS
Filed Feb. 18, 1969
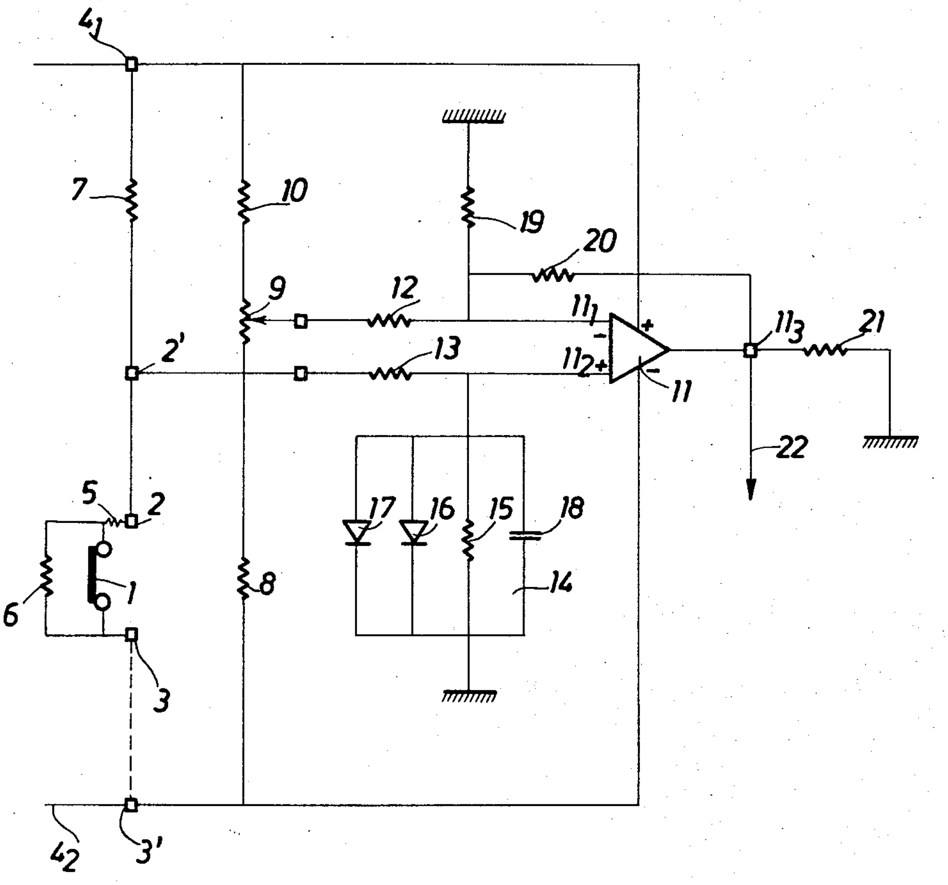
Jacques Gilbert Pinault
Inventor
By Littlepage, Quaintance, Wray & Aisenberg
Attys.

United States Patent Office 3,566,400
Patented Feb. 23, 1971

3,566,400

TELEALARM NETWORKS

Pinault Jacques Gilbert, Chatillon-sous-Bagneux, France, assignor to Societe Anonyme: Groupement Atomique Alsacienne Atlantique (G.A.A.A.), Les Plessis-Robinson, Seine, France, a corporation of France Filed Feb. 18, 1969, Ser. No. 800,054
Claims priority, application France, Feb. 20, 1968, 140,595
Int. Cl. G08b *23/00*
U.S. Cl. 340—409 1 Claim

ABSTRACT OF THE DISCLOSURE

In remote controlled alarm networks having a plurality of satellite stations connected to a central station, an improvement for reducing the line current to a safe value for use in explosive or fire risk atmospheres. Use is made of a resistance bridge of which one arm contains a satellite station with a switch operated variable resistance, the output of the bridge being fed to a difference amplifier for supplying an amplified output signal to said central station.

BACKGROUND OF INVENTION

Remote controlled alarm networks are known wherein a plurality of satellite stations are connected by lines to a remote central station; said central station being capable of (a) receiving calls from said satellite stations, (b) calling individual or groups of said satellite stations, (c) distinguishing between urgent and normal calls, and (d) indicating a malfunction in service loop lines. Such alarm networks may include a plurality of line cards corresponding to the satellite stations, each line card being capable of receiving and transmitting electrical signals. Each card may have two printed circuits, one circuit for detecting the level of a guard current normally present on a line connected to its corresponding satellite station, and the other being a logical circuit which is responsive to said detection circuit whereby a signal is transmitted for indicating a change in the normal guard current level. A synoptic localisation panel may be provided to represent topographically each satellite station, said panel being controlled by said logical circuits and an indicator being operated, e.g. a lamp being lit, due to a call or fault causing a change in the normal guard current level. A control panel may be connected to said synoptic panel and to a line selector, said line selector being connected to a measuring card for selectively carrying out check measurements on the connecting lines. Said indicator may include a sound warning device for alerting an operator who actuates said line selector to connect a line card to said measuring card, any call or fault on the line being indicated on a discrimination panel. Intercommunication means may be connected via said line selector between said control panel and satellite stations to allow said operator to communicate with a caller at any of said satellite stations. The alarm network may be energized by a suitable electrical source.

Such alarm networks may be used to observe phenomena occurring at said satellite stations. Line cards may be used wherein a switch is opened or closed in response to a change in some observed phenomena, for example, a system may be provided for controlling the approach to a building, or for controlling physical parameters by suitable detectors (e.g. fire, smoke, temperature, fluid leakage, and the like).

When the foregoing systems incorporate semiconductor devices advantages accrue in respect of operation, cost price, physical dimensions, and efficiency. Under these circumstances the normal guard current is generally lower than systems which employ electromagnetic relays but the guard current, which may be of the order of 1 milliamp, can be considered as too large for use in atmospheres that are explosive or capable of causing a fire.

The present invention overcomes this disadvantage and enables the active guard current to be reduced, for example, to a few microamps. This result is achieved by placing the connecting lines of an alarm network in a "self-guard" state by connecting satellite stations to a bridge circuit supplying an output signal to comparator means. Said comparator means may conveniently be an operational amplifier providing an amplified difference signal from the off-balance bridge output. Accordingly, the line resistance may be higher enabling the use of conductors with reduced cross-section and increased length. Further, measurement resolution may be increased by using resistors of high ohmic value in the bridge circuit; an output signal amplified in power and voltage being developed across a low valued resistor connected to the output of the comparator means.

It is an object of this invention to reduce the normal guard current in the connecting lines of a remote controlled alarm network having a plurality of satellite stations connected to a central station.

It is a further object of this invention to reduce said guard current to a value whereby its said connecting lines and satellite stations may be used in explosive or high fire risk atmospheres.

Another object of this invention is to enable the use of connecting lines having reduced cross-section and increased length.

A further object of this invention is to increase the resolution of measurement circuits for measuring changes in said normal guard current.

SUMMARY OF INVENTION

In a remote controlled alarm network having a plurality of satellite stations connected to a central station via connecting lines, an improvement for reducing the normal guard current level (for example to the order of microamps) including a bridge network connected to comparator means whereby an amplified differences signal is available for operating alarm means, automatic signalling means, or intercommunication means or combinations thereof at said central station.

Said bridge network preferably comprises high value resistors including a potentiometer and conductors connected to said satellite station. Said comparator means is an operational difference amplifier resistance coupled to the bridge output via said potentiometer. The arms of said bridge network include two fixed resistors connected on either side of said potentiometer, and a fixed resistor in series with said satellite station and its connecting lines. Guard conductors are connected to the input of said bridge network. A filter and a voltage control network may be connected to the bridge output circuit for removing spurious signals and for protecting said amplifier against overvoltage conditions respectively. The output of said amplifier is connected to a resistor across which an amplified difference signal is developed for energizing an alarm, an automatic signaller, or an intercommunication channel, or combinations thereof at said central station.

Other features and advantages of this invention will be apparent from the following description of an exemplary embodiment schematically illustrated in the accompanying drawing which is a circuit diagram of part of a remote controlled alarm network.

In the drawing a satellite or detector station having a switch 1 is connected between two terminals 2 and 3 respectively connected to two terminals 2' and 3' of a guard line 4 under watch comprising two wires $4_1$ and $4_2$. The satellite station in this arrangement contains a resistor 5 and a resistor 6 which are respectively in series and in parallel with the switch 1. A resistor 7 is provided between the terminal 2' and the wire $4_1$. Between the two wires $4_1$ and $4_2$ there are disposed three series resistors 8, 9, and 10, the resistors 5 and 7 being equal and the resistors 8 and 10 likewise being equal; the resistor 9 is a potentiometer permitting the balancing of the bridge constituted by the resistors 5 to 10, and having apices 2, 2', 3 and 3' (effectively coincident) and 9.

The slider of the resistor 9 and the terminal 2' are connected respectively to the inputs $11_1$ and $11_2$ of an operational amplifier 11 by means of resistors 12 and 13 respectively. Between the resistor 13 and the corresponding input of said amplifier 11 there is connected an assembly 14 for protecting amplifier 11 against overvoltage and inductive interference. Said assembly comprises a protective circuit formed by a resistor 15 and opposite diodes 16, 17 connected in parallel, a filter circuit being formed by capacitor 18 in parallel with resistor 15.

Between the resistor 12 and input $11_1$ of amplifier 11 there is a connection to a voltage divider network formed by a resistor 19 and a resistor 20. Resistor 20 provides a feedback loop from the output $11_3$ of said amplifier 11, and the ratio between the resistors 19 and 20 determines the voltage gain of said amplifier. Potentiometer 9 serves to balance said bridge, and resistors 12 and 13 match the bridge output to the input impedance of said amplifier 11. The output terminal $11_3$ is connected to a resistor 21 which is connected to ground. A voltage signal developed across resistor 21 is transmitted by a line 22 to a threshold discriminator contained by, for example, a line card in the aforementioned known alarm network.

In a practical example when the resistors 5 and 7 were $10^6\Omega$, the resistors 8 and 10 were $5.10^4\Omega$, and the resistor 6 was $10^6\Omega$, the line current was 10 $\mu$a. The voltage gain of said amplifier 11 is fixed by the ratio between said resistors 19 and 20 and was substantially equal to 100. The resistor 21 was approximately $500\Omega$.

Under these conditions the output signal on line 22 can be directly used (after discrimination of its threshold level) by any suitable logical circuits.

In the above example, an operational amplifier of the type $\mu$A709 made by S.G.S. Fairchild was used as amplifier 11 and the following results were obtained.

| State of apparatus: | Voltage at $11_3$ |
|---|---|
| (1) Switch **1** closed | $0\pm20$ mv. |
| Switch **1** open (alarm) | +2.5 v.$\pm$0.1 v. |
| (2) Line **4** broken ($R\infty$) | +5.5 v. |
| Line **4** broken ($R=47K\Omega$) | +0.7 v. |
| (3) Short-circuit ($R=0\Omega$) | −7.2 v. |
| Short-circuit ($R=4.7M\Omega$) | −2 v. |

Thus a threshold voltage discriminator situated downstream of line 22 and having thresholds fixed at $\pm$0.1 v., is capable of supplying a logical signal for any incident which may occur on the line.

The comparator $\mu$A709 may be followed by an integrated circuit of the type $\mu$A711 made by S.G.S. Fairchild, or by any other equivalent circuit. Other preset threshold voltage discriminators may be used to discriminate between different incidents occurring on the line.

What is claimed is:

1. In a remote controlled alarm network, a plurality of detecting satellite stations arranged each at a given position of the region to be surveyed, a two-wire conducting line extending from each one of these stations, a line card connected to each satellite station, on each of said cards a first circuit connected to the two-wire line of the station of said line to detect any modification intervening at said station or on said line, on each line card a logical circuit responsive to the said modifications on one of the wires leading to at least one of the linecards of a satellite station, a four apices resisting bridge with one branch comprising the said satellite station and its wire line and the other branch comprising a high gain operational amplifier the inlets of which are connected to those apices of the bridge which does not include the said satellite station, and the outlet of said amplifier being connected to the first circuit of the said line card, a localization synoptic panel with inlets and outputs and representative means arranged on said panel, each of said representative means representing individually one of the satellite stations according to their distribution in said region to be surveyed, a two-wire line connecting said means representative of a satellite station, through one outlet of the said panel, an output of said synoptic panel connected to each of said representative means, an alarm member connected to said output, a control assembly adapted to be actuated by said localization synoptic panel, a line selector connected through individual electric links to each one of the second circuits on said line cards, a direct electric connection between said line selector and the control assembly, a measurement card on which are marked circuits enabling at least certain measurements to be effected which measurements are necessary for checking the two-wire lines, means for connecting said circuits of the measurement card to one of the individual links of the selector, a synoptic panel carrying call or fault identification means, intercommunication means between the control panel and the selector adapted to establish communication with any one of the satellite stations, a direct current electric power supply feeding the control assembly and subsequently the various circuits, the two-wire lines and the detecting stations.

References Cited

UNITED STATES PATENTS 3,430,231 2/1969 Weld ............ 340—409

THOMAS B. HABECKER, Primary Examiner

U.S. Cl. X.R.

340—225